United States Patent
Hechtman et al.

(10) Patent No.: US 9,436,395 B2
(45) Date of Patent: Sep. 6, 2016

(54) MECHANISMS TO SAVE USER/KERNEL COPY FOR CROSS DEVICE COMMUNICATIONS

(71) Applicant: Advanced Micro Devices, Inc., Sunnyvale, CA (US)

(72) Inventors: Blake A. Hechtman, Bellevue, WA (US); Shuai Che, Bellevue, WA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 358 days.

(21) Appl. No.: 14/213,640

(22) Filed: Mar. 14, 2014

(65) Prior Publication Data
US 2015/0261457 A1 Sep. 17, 2015

(51) Int. Cl.
| | | |
|---|---|---|
| G06F 9/26 | (2006.01) | |
| G06F 3/06 | (2006.01) | |
| G06F 12/10 | (2016.01) | |
| G06F 9/52 | (2006.01) | |
| G06F 9/54 | (2006.01) | |
| G06F 12/14 | (2006.01) | |

(52) U.S. Cl.
CPC ............ *G06F 3/0619* (2013.01); *G06F 3/065* (2013.01); *G06F 3/067* (2013.01); *G06F 3/0637* (2013.01); *G06F 9/52* (2013.01); *G06F 9/54* (2013.01); *G06F 12/1081* (2013.01); *G06F 12/1491* (2013.01); *G06F 2212/1024* (2013.01); *G06F 2212/657* (2013.01)

(58) Field of Classification Search
USPC ...................... 711/205, 6; 710/308
See application file for complete search history.

(56) References Cited

U.S. PATENT DOCUMENTS

| | | | |
|---|---|---|---|
| 5,895,499 A | 4/1999 | Chu | |
| 6,044,445 A | 3/2000 | Tsuda et al. | |
| 6,349,355 B1* | 2/2002 | Draves | G06F 9/4843 711/203 |
| 6,891,543 B2 | 5/2005 | Wyatt | |
| 7,451,456 B2 | 11/2008 | Andjelic | |
| 8,395,631 B1 | 3/2013 | Wilt | |
| 8,397,241 B2 | 3/2013 | Xiaocheng et al. | |
| 2002/0152330 A1* | 10/2002 | Casper | G06F 11/3632 719/318 |
| 2003/0120856 A1* | 6/2003 | Neiger | G06F 12/0284 711/6 |
| 2007/0011687 A1* | 1/2007 | Ilik | G06F 9/546 719/313 |
| 2008/0126762 A1* | 5/2008 | Kelley | G06F 9/547 712/225 |
| 2010/0228895 A1* | 9/2010 | Kim | G06F 9/545 710/33 |
| 2010/0299667 A1 | 11/2010 | Ahmad et al. | |
| 2012/0246381 A1 | 9/2012 | Kegel et al. | |
| 2013/0007406 A1 | 1/2013 | Sheaffer et al. | |
| 2013/0021353 A1 | 1/2013 | Drebin et al. | |
| 2013/0027410 A1 | 1/2013 | Ginzburg et al. | |

FOREIGN PATENT DOCUMENTS

JP 2012238316 A * 12/2012
WO WO 2012/037706 A1 3/2012

* cited by examiner

*Primary Examiner* — Paul R Myers
(74) *Attorney, Agent, or Firm* — Volpe and Koenig, P.C.

(57) ABSTRACT

Central processing units (CPUs) in computing systems manage graphics processing units (GPUs), network processors, security co-processors, and other data heavy devices as buffered peripherals using device drivers. Unfortunately, as a result of large and latency-sensitive data transfers between CPUs and these external devices, and memory partitioned into kernel-access and user-access spaces, these schemes to manage peripherals may introduce latency and memory use inefficiencies. Proposed are schemes to reduce latency and redundant memory copies using virtual to physical page remapping while maintaining user/kernel level access abstractions.

20 Claims, 7 Drawing Sheets

MECHANISMS TO SAVE USER/KERNEL COPY FOR CROSS DEVICE COMMUNICATIONS

BACKGROUND

1. Field of the Disclosure

The disclosure generally relates to cross-device communications, and more specifically to techniques to reduce redundant copies of data across user and kernel space boundaries in a virtual memory address space.

2. Related Art

Central processing units (CPUs) in computing systems may manage graphics processing units (GPUs), network processors, security co-processors, and other data heavy devices as buffered peripherals using device drivers. Unfortunately, as a result of large and latency-sensitive data transfers required between CPUs and these external devices, and memory partitioned into kernel-access and user-access spaces, these schemes to manage peripherals may introduce latency and memory use inefficiencies.

For example, an exemplary computing system may include a CPU and GPU sharing a common memory address space, with each of the CPU and GPU having a page-locked buffer in kernel-access memory address space. Direct memory access (DMA) controllers may transfer data between the CPU buffer in kernel-access memory address space and the CPU, and between the GPU buffer in kernel-access memory address space and the GPU, without direct intervention of the CPU. However, to transfer data, for example, from the CPU to the GPU, may result in creating a redundant non-page-locked buffer in user-access memory address space, copying data from the CPU buffer to the user-access buffer, and copying data from the user-access buffer to the GPU buffer. Kernel application programming interfaces (APIs) may include functionality to copy data between kernel-access and user-access buffers.

Various proposed schemes to avoid creation of a redundant non-page-locked buffer during data transfer between devices have included customized hardware support of interconnected devices, or collaboration between device vendors during development of device drivers. These schemes introduce additional disadvantages, such as incompatibility with new devices, and standard hardware interfaces or common device drivers that may drive additional cost and complexity into the development of new devices. As such, apparatus and methods to transfer data between devices that minimizes redundant data copies and latency, while utilizing existing kernel APIs provides significant advantages.

SUMMARY

One exemplary embodiment includes a method to copy data comprising mapping, with kernel permissions, a first virtual memory address to a first physical memory address, mapping, with kernel permissions, a second virtual memory address to a second physical memory address. This embodiment further includes receiving the data at the first physical memory address, mapping, with user permissions, a third virtual memory address to the first physical memory address, and copying, with kernel permissions, the data from the first physical memory address to the second physical memory address.

Another exemplary embodiment includes a system to copy data comprising a memory and a processor, coupled to the memory, configured to map, with kernel permissions, a first virtual memory address to a first physical memory address in the memory. This embodiment includes the processor configured to map, with kernel permissions, a second virtual memory address to a second physical memory address in the memory and receive the data at the first physical memory address. Still further, this embodiment includes the processor configured to map, with user permissions, a third virtual memory address to the first physical memory address, and copy, with kernel permissions, the data from the first physical memory address to the second physical memory address.

An additional exemplary embodiment includes a non-transitory computer readable medium comprising instructions that when executed by a processor cause the processor to map, with kernel permissions, a first virtual memory address to a first physical memory address and map, with kernel permissions, a second virtual memory address to a second physical memory address and receive data at the first physical memory address. This exemplary embodiment also includes the non-transitory computer readable medium comprising instructions that when executed by a processor cause the processor to map, with user permissions, a third virtual memory address to the first physical memory address, and copy, with kernel permissions, the data from the first physical memory address to the second physical memory address.

The above exemplary embodiments will become more readily apparent from the following detailed description with reference to the accompanying drawings. However, the above exemplary embodiments do not limit additional disclosed embodiments present in the following detailed description.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
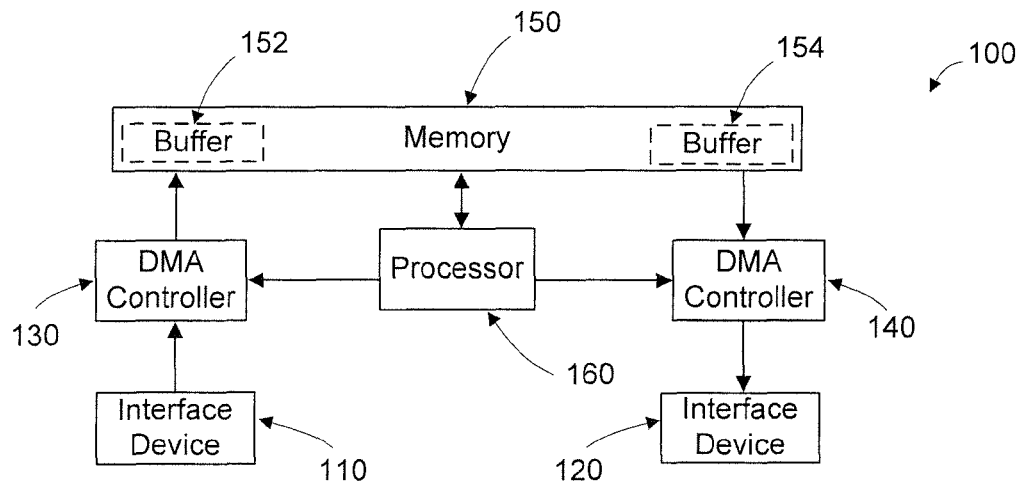
FIG. 1 illustrates a block diagram of a computing system comprising multiple DMA device interfaces according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

FIG. 1 illustrates a block diagram of a computing system 100 comprising multiple interface devices 110 and 120, each including a DMA controller 130 and 140, interfacing with a shared memory 150. A processor 160 interfaces with the DMA controllers 130 and 140, and the shared memory 150. In one embodiment, the processor 160 may execute instructions stored in the memory 150 that cause the processor 160 to configure the DMA controller 130 to transfer data from the interface device 110 to an input buffer 152 in the memory 150 without further intervention from the processor 160. Likewise, the processor 160 may execute instructions stored in the memory 150 that cause the processor 160 to configure the DMA controller 140 to transfer data from an output buffer 154 in the memory 150 to the interface device 120 without further intervention from the processor 160.

As such, as data becomes available at the interface device 110, the DMA controller 130 transfers data from the interface device 110 to the input buffer 152 and the processor 160 may process the data stored therein. When data becomes available in the output buffer 154, the DMA controller 140 may transfer the data stored therein to the interface device 120. In some embodiments, to transfer data from the interface device 110 to the interface 120, the processor 160 may generate an intermediate copy of data stored in the input buffer 152, and subsequently move the data to the output buffer 154.

Figure 2:
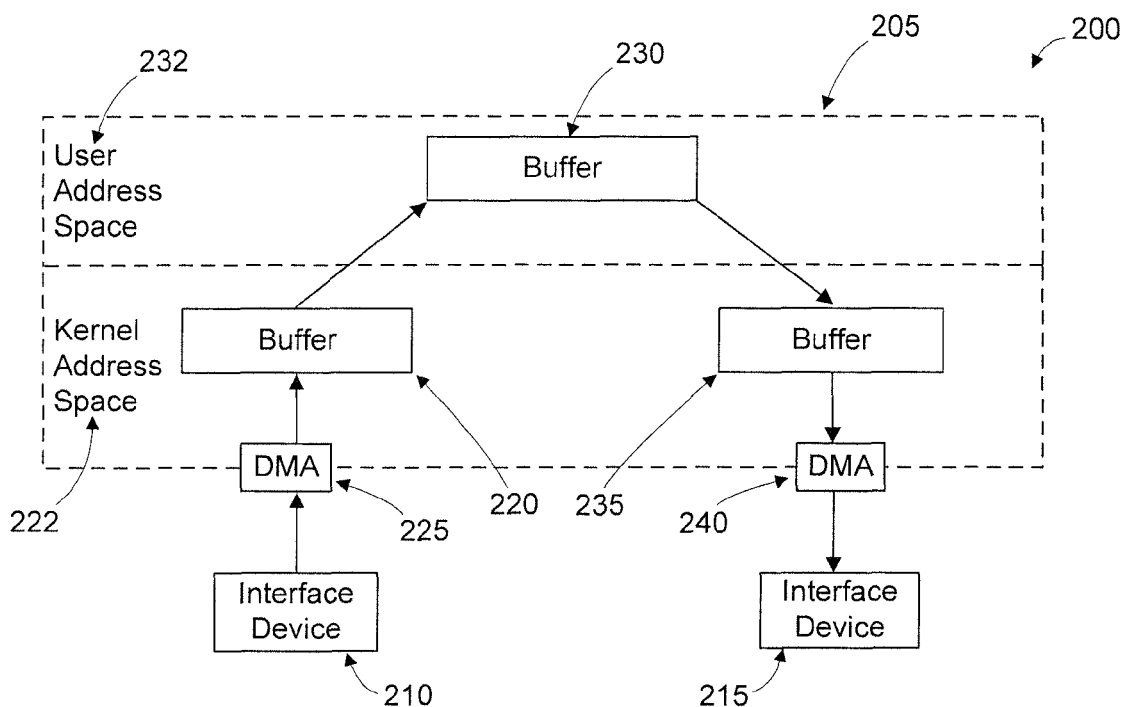
FIG. 2 illustrates a block diagram of a computing system comprising a shared memory partitioned into user and kernel access memory address spaces according to an exemplary embodiment of the present disclosure.

FIG. 2 illustrates a block diagram of a computing system 200 including a shared memory 205 partitioned into a user address space 232 and a kernel address space 222. The user address space 232 may, in some embodiments, include a range of memory addresses that a process with user-level permissions executing on a processor (not illustrated in FIG. 2) may read, write, or modify. Likewise, the kernel address space 222 may, in some embodiments, include a range of memory addresses that a process with kernel-level permissions executing on a processor (not illustrated in FIG. 2) may read, write, or modify.

Similar to FIG. 1, the computing system 200 includes interface devices 210 and 215, each including respective DMA controllers 225 and 240. The DMA controller 225 may transfer data from the interface device 210 into an input buffer 220, page-locked in the kernel address space 222 of the memory 205. Likewise, the DMA controller 240 may transfer data from an output buffer 235, page-locked in the kernel address space 222 of the memory 205 to the interface device 215. As such, a process with kernel-level permissions, executing on a processor (not illustrated in FIG. 2), may read, write, or modify the input buffer 220 or output buffer 235. In some embodiments, the input buffer 220 may be copied to a user buffer 230 in the user address space by a process with user-level permissions executing a kernel API function, such as copy_to_user( ), that spawns or instructs a process with kernel permissions to allocate the user buffer 230, and copy data from the input buffer 220 to the user buffer 230. Likewise, the user buffer 230 may be copied to the output buffer 235 by a process with user-level permissions executing a kernel API function, such as copy_from_user( ), that spawns or instructs a process with kernel permissions to copy data from the user buffer 230 to the output buffer 235. Thus, the memory 205 provides a conduit for data transfer between the interface device 210 and the interface device 215 while maintaining a user/kernel permission separation of the memory 205.

Figure 3:
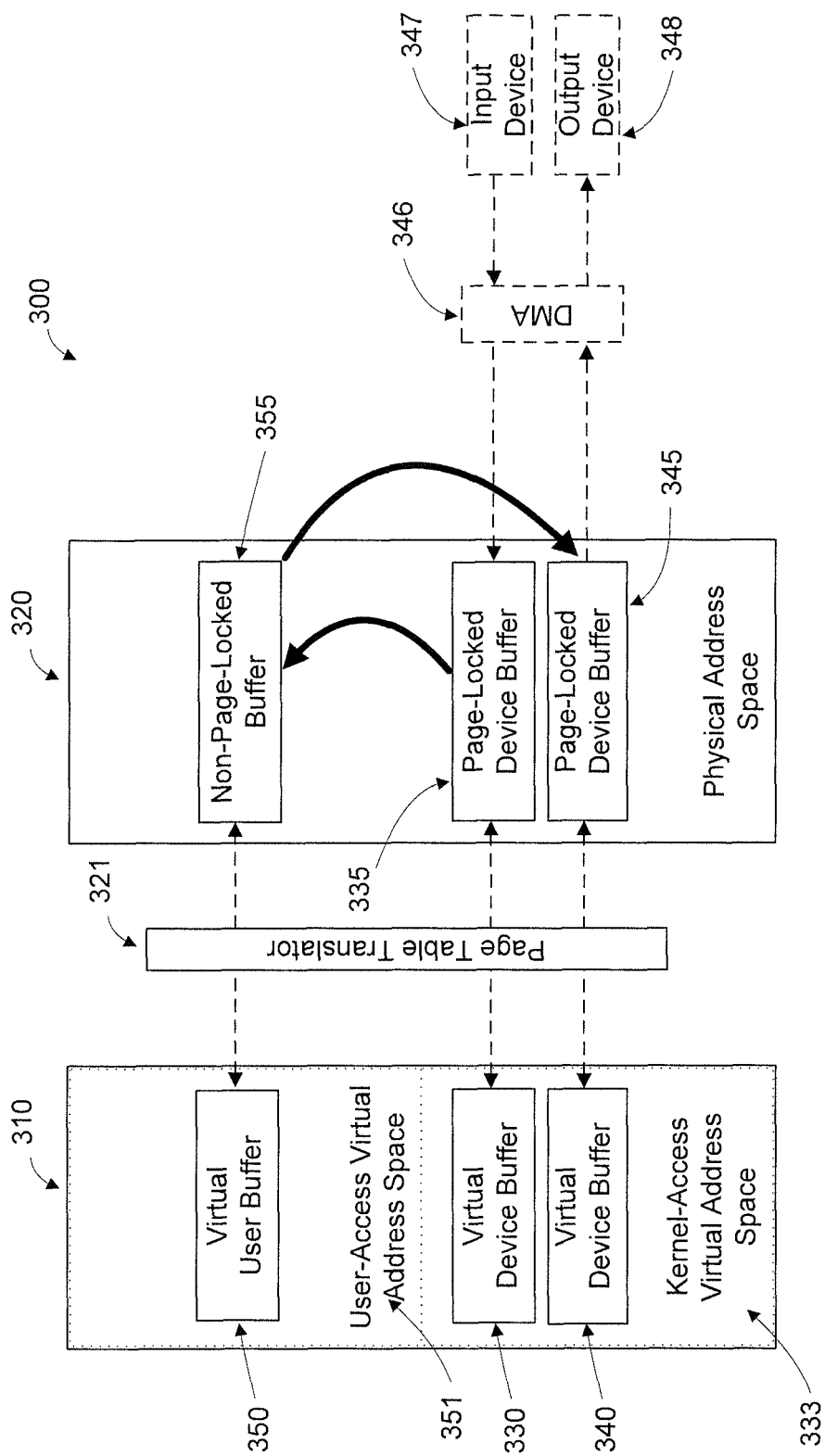
FIG. 3 illustrates a block diagram of a memory system including two device interfaces according to an exemplary embodiment of the present disclosure.

FIG. 3 illustrates a block diagram of a memory system 300 including a virtual memory address space 310, a physical memory address space 320, a page table translator 321, and interfaces to an input device 347 and an output device 348 through a DMA controller 346. The virtual memory address space 310 may comprise a plurality of memory addresses that map to a plurality of memory addresses in the physical memory address space 320. The page table translator 321 may translate a given virtual memory address in the virtual memory address space 310 to a physical memory address in the physical memory address space 320, and vice versa. Similar to FIG. 2, the DMA controller 346 may transfer data between the input device 347 and output device 348 and their respective page-locked device buffers 335 and 345. Each page-locked device buffer 335 and 345 in the physical address space 320 may have a corresponding virtual device buffer 330 and 340 in a kernel-access virtual memory address space 333 of the virtual memory address space 310. In some embodiments, a process with kernel-level permission running on a processor may read, write, or modify the virtual device buffers 330 and 340 in the kernel-access virtual memory address space 333 of the virtual memory address space 310.

In one embodiment, the DMA controller 346 transfers data from the input device 347 into a page-locked device buffer 335 in the physical address space 320. A process with user-level permissions executing on a processor executes a kernel API function, for example, copy_to_user( ), a process with kernel-level permissions may instantiate a non-page-locked buffer 355 in the physical address space 320. Subsequently, the process with kernel-level permissions may instantiate a virtual user buffer 350 and update the page table translator 321 to indicate that the non-page-locked buffer 355 corresponds to the virtual user buffer 350. In such an embodiment, the copy_to_user( ) kernel API may further cause a process with kernel-level permissions to copy data from the page-locked device buffer 335 to the non-page-locked buffer 355. At this point, a process with user-level permissions may read, write, or modify the data contained in the non-page-locked buffer 355, and the corresponding virtual user buffer 350. Likewise, the process with user-level permissions may execute a kernel API function, for example, copy_from_user( ), causing a process with kernel-level permissions to copy the data from the non-page-locked buffer 355 to the page-locked device buffer 345. The DMA controller 346 may transfer the data in the page-locked device buffer 345 to an output device 348, thus completing the transfer of data from the input device 347 to the output device 348. In other embodiments, the input device 347 and output device 348 may comprise one device with both input and output capabilities.

Figure 4:
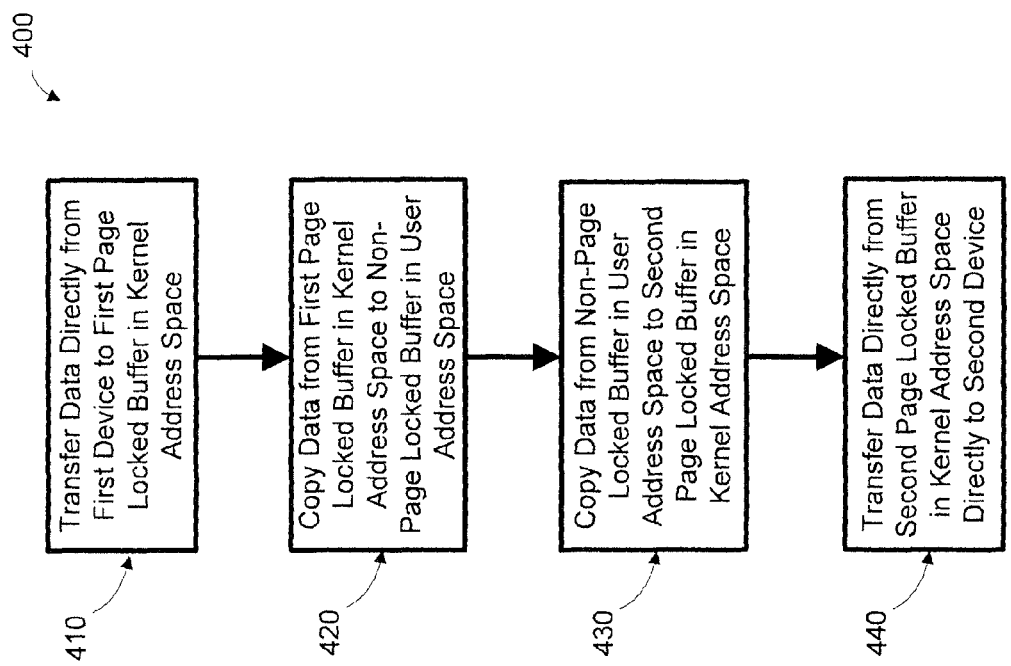
FIG. 4 illustrates a flowchart including operational steps to transfer data between two devices using a shared memory according to an exemplary embodiment of the present disclosure.

FIG. 4 illustrates a flowchart 400 including operational steps to transfer data between two devices using a memory including a kernel address space and a user address space. The flowchart illustrated in FIG. 4 references the exemplary embodiment illustrated in FIGS. 1-3, however, the exemplary embodiments illustrated in FIGS. 1-3 do not limit the exemplary method steps illustrated in flowchart 400. Furthermore, the order of method steps illustrated in flowchart 400, in some embodiments, may execute in alternative orders, or in other embodiments, execute simultaneously while remaining within the scope and spirit of the disclosure.

The flowchart 400 includes step 410, wherein, in some embodiments, a DMA controller, similar to the DMA controller 346 of FIG. 3, transfers data directly from a first device, to a first page-locked buffer in a kernel address space. The first device may correspond, in some embodiments, to the input device 347 of FIG. 3, and the first page-locked buffer may correspond to the non-page-locked device buffer 355, and the corresponding virtual device buffer 330 in the kernel-access virtual address space 333.

Step 420 includes, in some embodiments, a process with kernel-level permissions, executing on a processor, copying data from the first page-locked buffer in kernel address space to a non-page-locked buffer in user address space. In a similar embodiment, the process with kernel-level permissions, executing on the processor, at step 430, copies data from the non-page-locked buffer in user address space to a second page-locked buffer in kernel address space.

The second page-locked buffer in kernel address space in some embodiments, corresponds to the page-locked device buffer 345, and the corresponding virtual device buffer 340 in the kernel-access virtual address space 333. Step 440, includes, in some embodiments, a DMA controller transfers data directly from the second page-locked buffer in kernel address space to a second device. The DMA controller may correspond, for example, to the DMA controller 346 in FIG. 3. Likewise, the second device may correspond, for example to the output device 348 in FIG. 3. Thus, the flowchart 400 enables data transfer from the first device to the second device using a memory including a kernel address space and a user address space.

Figure 5:
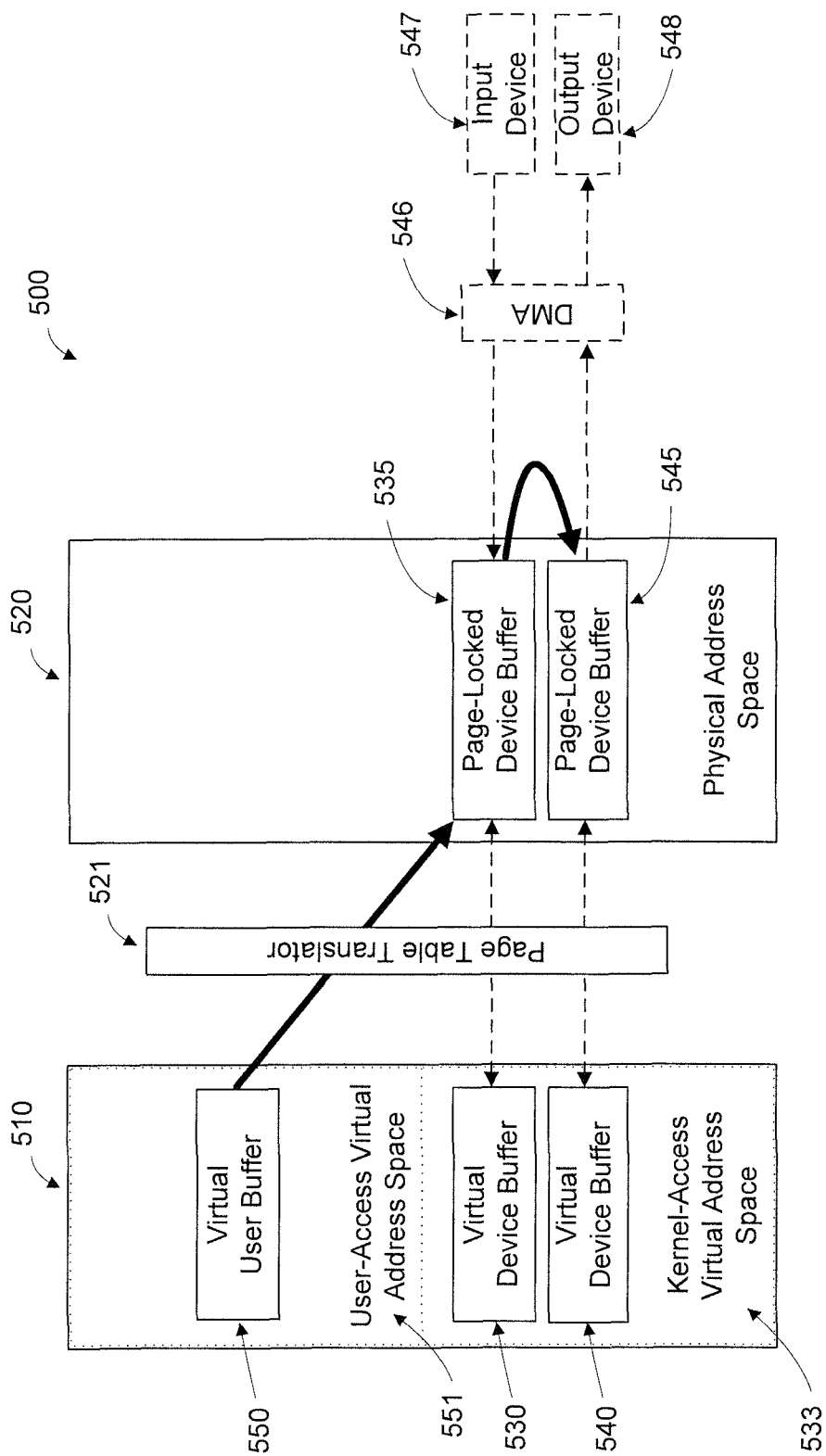
FIG. 5 illustrates a block diagram of a memory system including virtual to physical address remapping according to an exemplary embodiment of the present disclosure.

FIG. 5 illustrates a block diagram of a memory system 500, similar to the memory system 300 in FIG. 3, including a virtual memory address space 510, a physical memory address space 520, a page table translator 521, and interfaces to an input device 547 and an output device 548 through a DMA controller 546. The virtual memory address space 510 may comprise a plurality of memory addresses that map to a plurality of memory addresses in the physical memory address space 520. The page table translator 521 may translate a given virtual memory address in the virtual memory address space 510 to a physical memory address in the physical memory address space 520, and vice versa. Similar to FIG. 3, the DMA controller 546 may transfer data between the input device 547 and output device 548 and their respective page-locked device buffers 535 and 545. Each page-locked device buffer 535 and 545 in the physical address space 520 may have a corresponding virtual device buffer 530 and 540 in a kernel-access portion 533 of the virtual memory address space 510. In some embodiments, a process with kernel-level permission running on a processor may read, write, or modify the virtual device buffers 530 and 540 in the kernel-access portion 533 of the virtual memory address space 510.

In one embodiment, the DMA controller 546 transfers data from the input device 547 into a page-locked device buffer 535 in the physical address space 520. A process with user-level permissions, executes a modified kernel API function, for example, a modified version of copy_to_user( ). The modified version of copy_to_user( ) may spawn or cause a process with kernel-level permissions to instantiate a virtual user buffer 550 in the user-access virtual address space 551 and update the page table translator 521 to indicate that the virtual user buffer 550 also corresponds to the page-locked device buffer 535. Thus, the page-locked device buffer 535 now has two corresponding buffers, the virtual user buffer 550 in the user-access address space 551, and the virtual device buffer 530 in kernel address space 533. The modified version of copy_to_user( ) may for example be included as a configuration option when a driver is linked into the kernel compiler option. In other embodiments, the modified version of copy_to_user( ) may be a compilation option for the kernel itself.

In the above embodiment, in order to preserve the user/kernel access abstraction, the page-locked device buffer 535 may be designated as copy-on-write. A copy-on write designation may indicate that if the page-locked device buffer 535, or the corresponding virtual user buffer 550 is modified or over-written by a process with user-level access, that the page-locked device buffer 535 be first copied to another physical memory location before modification.

A process with user-access may execute, for example, the copy_from_user( ) kernel API that causes a process with kernel-level permissions to copy data from the page-locked device buffer 535 to the page-locked device buffer 545. Thus, a similar copy from the page-locked device buffer 535 to the page-locked device buffer 545 occurs without instantiating the non-page-locked buffer 355 of FIG. 3 while maintaining the user/kernel access abstraction. Subsequently, the DMA controller 546 may transfer the data in the page-locked device buffer 545 to an output device 548, thus completing the transfer of data from the input device 547 to the output device 548. In other embodiments, the input device 547 and output device 548 may comprise one device with both input and output capabilities.

Figure 6:
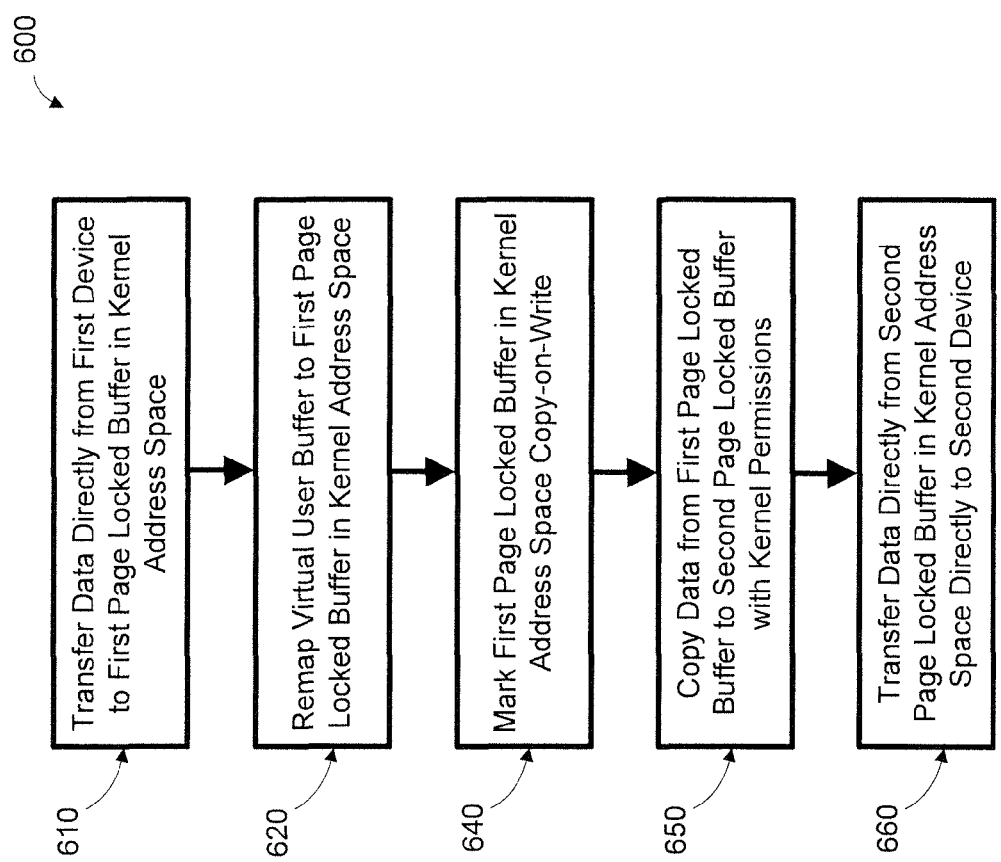
FIG. 6 illustrates a flowchart including operational steps to transfer data between two devices using a shared memory according to an exemplary embodiment of the present disclosure.

FIG. 6 illustrates a flowchart 600 including operational steps to transfer data between two devices using a memory including a kernel address space and a user address space. The flowchart illustrated in FIG. 6 references the exemplary embodiment illustrated in FIG. 5, however, the exemplary embodiment illustrated in FIG. 5 does not limit the exemplary method steps illustrated in flowchart 600. Furthermore, the order of method steps illustrated in flowchart 600, in some embodiments, may execute in alternative orders, or in other embodiments, execute simultaneously while remaining within the scope and spirit of the disclosure.

The flowchart 600 includes step 610, wherein, in some embodiments, a DMA controller, similar to the DMA controller 546 of FIG. 5, transfers data directly from a first device, to a first page-locked buffer in a kernel address space. The first device may correspond, in some embodiments, to the input device 547 of FIG. 5, and the first page-locked buffer may correspond to the page-locked device buffer 535, and the corresponding virtual device buffer 530 in the kernel-access virtual address space 533.

Step 620 includes, in some embodiments, a process with kernel-level permissions that remaps a virtual user buffer in a page table translator to the first page-locked buffer in a kernel address space. In one embodiment, the virtual user buffer corresponds to the virtual user buffer 550 of FIG. 5, and the page table translator corresponds to the page table translator 521 of FIG. 5.

Step 640 includes marking the first page-locked buffer in kernel address space copy-on-write. In some embodiments, the copy-on-write indication resides in the page table translator 521 of FIG. 5. In a similar embodiment, the process with kernel-level permissions, executing on the processor, at step 650, copies data from the first page-locked buffer to a second page-locked buffer.

The second page-locked buffer in kernel address space in some embodiments, corresponds to the page-locked device buffer 545 and the corresponding virtual device buffer 540 in the kernel-access virtual address space 533. Step 660, includes, in some embodiments, a DMA controller transferring data directly from the second page-locked buffer in kernel address space to a second device. The DMA controller may correspond, for example, to the DMA controller 546 in FIG. 5. Likewise, the second device may correspond, for example to the output device 548 in FIG. 5. Thus, the flowchart 600 enables data transfer from the first device to the second device that reduces redundant physical memory copies while maintaining the user/kernel access abstraction.

Figure 7:
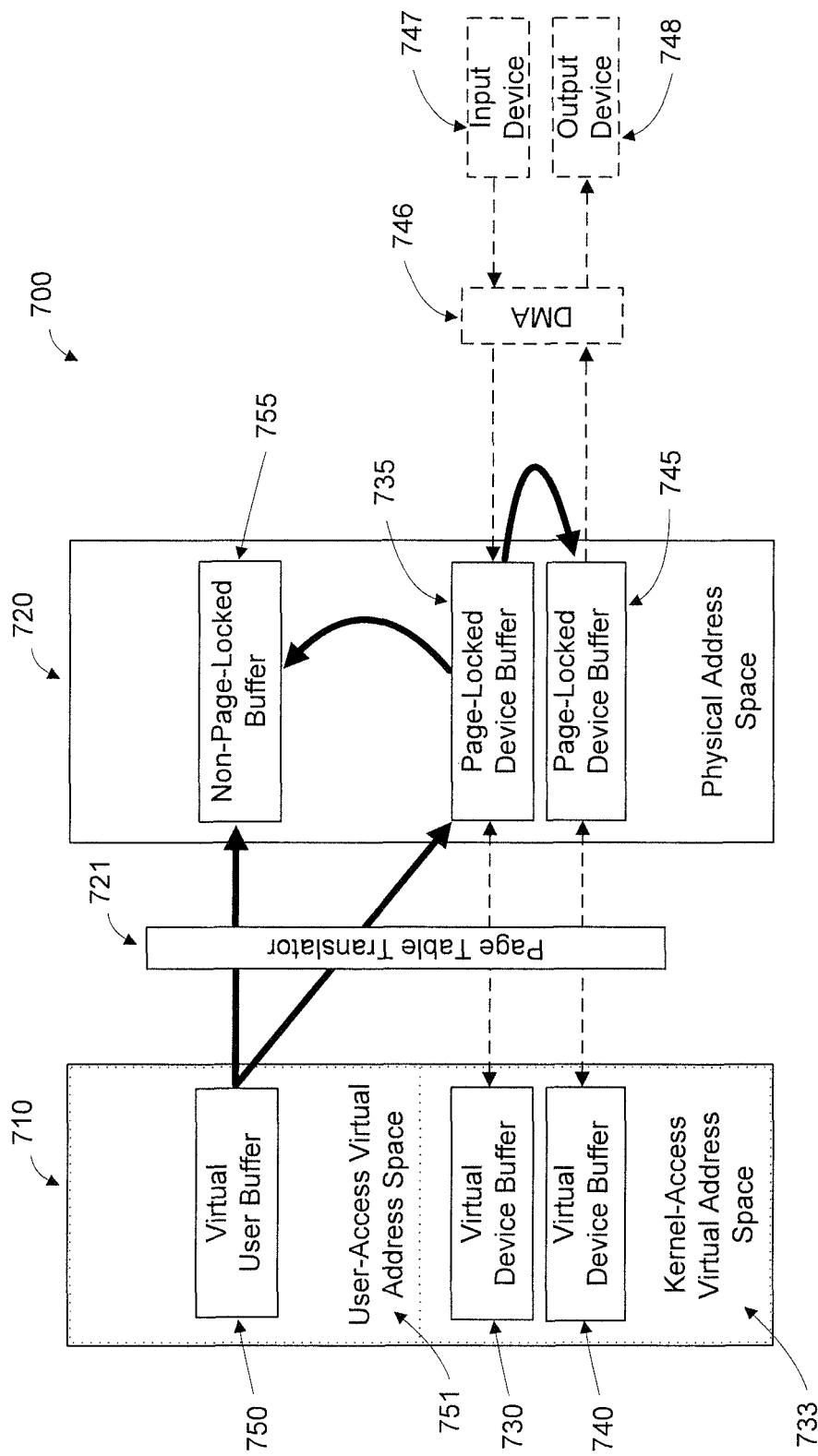
FIG. 7 illustrates a block diagram of a memory system including virtual to physical address remapping and copy-on-write according to an exemplary embodiment of the present disclosure.

FIG. 7 illustrates a block diagram of a memory system 700, similar to the memory system 500 in FIG. 5, including a virtual memory address space 710, a physical memory address space 720, a page table translator 721, and interfaces to an input device 747 and an output device 748 through a DMA controller 746. The virtual memory address space 710 may comprise a plurality of memory addresses that map to a plurality of memory addresses in the physical memory address space 720. The page table translator 721 may translate a given virtual memory address in the virtual memory address space 710 to a physical memory address in the physical memory address space 720, and vice versa. Similar to FIG. 5, the DMA controller 746 may transfer data between the input device 747 and output device 748 and their respective page-locked device buffers 735 and 745. Each page-locked device buffer 735 and 745 in the physical address space 720 may have a corresponding virtual device buffer 730 and 740 in a kernel-access portion 733 of the virtual memory address space 710. In some embodiments, a process with kernel-level permission running on a processor may read, write, or modify the virtual device buffers 730 and 740 in the kernel-access portion 733 of the virtual memory address space 710.

In one embodiment, the DMA controller 746 transfers data from the input device 747 into a page-locked device buffer 735 in the physical address space 720. A process with user-level permissions, executes a modified kernel API function, for example, a modified version of copy_to_user( ). The modified version of copy_to_user( ) may spawn or cause a process with kernel-level permissions to instantiate a virtual user buffer 750 in the user-access virtual address space 751 and update the page table translator 721 to indicate that the virtual user buffer 750 also corresponds to the page-locked device buffer 735. Thus, the page-locked device buffer 735 now has two corresponding buffers, the virtual user buffer 750 in the user-access address space 751, and the virtual device buffer 730 in kernel address space 733. The modified version of copy_to_user( ) may for example be included as a configuration option when a driver is linked into the kernel compiler option. In other embodiments, the modified version of copy_to_user( ) may be a compilation option for the kernel itself.

In the above embodiment, in order to preserve the user/kernel access abstraction, the page-locked device buffer 735 may be designated as copy-on-write. A copy-on write designation may indicate that if the page-locked device buffer 735, or the corresponding virtual user buffer 750 is modified or over-written by a process with user-level access, that the page-locked device buffer 735 be first copied to another physical memory location before modification. When such a modification or over-write occurs by a process with user-access, a process with kernel-access instantiates a non-page-locked buffer 755 and updates the page table translator 721 to indicate that the virtual user buffer 750 corresponds to the non-page-locked buffer 755. At this point, a process with user-level permissions may read, write, or modify the data contained in the non-page-locked buffer 755, and the corresponding virtual user buffer 750.

Similar to the embodiments illustrated in FIGS. 3 and 5, a process with user-access may execute, for example, the copy_from_user( ) kernel API that causes a process with kernel-level permissions to copy data from the page-locked device buffer 735 to the page-locked device buffer 745. Thus, a similar copy from the page-locked buffer 735 to the page-locked device buffer 745 occurs without instantiating the non-page-locked buffer 355 of FIG. 3 while maintaining the user/kernel access abstraction. Subsequently, the DMA controller 746 may transfer the data in the page-locked device buffer 745 to an output device 748, thus completing the transfer of data from the input device 747 to the output device 748. In other embodiments, the input device 747 and output device 748 may comprise one device with both input and output capabilities.

Figure 8:
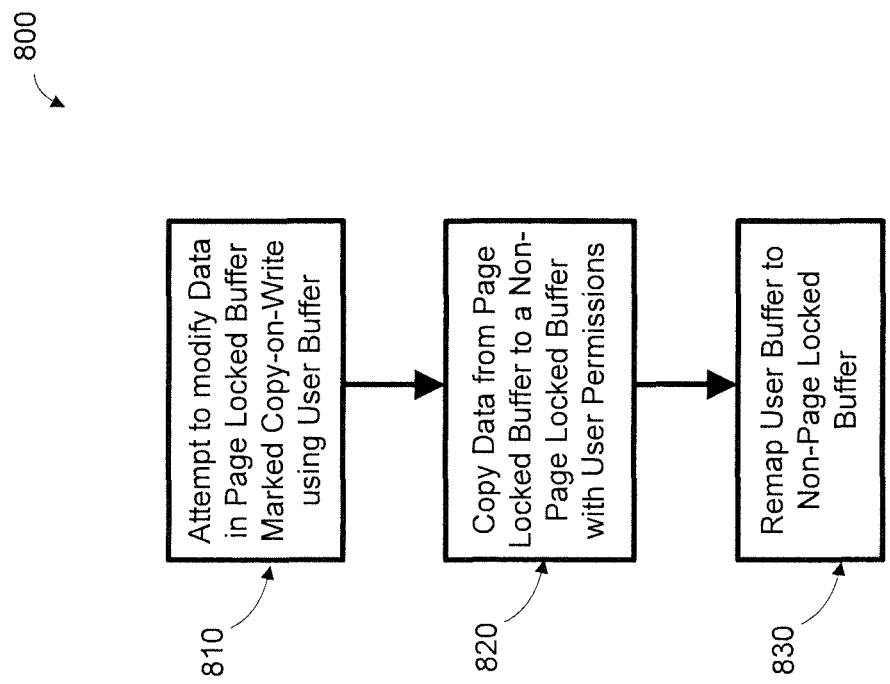
FIG. 8 illustrates a flowchart including operational steps to preserve the integrity of copy-on-write device buffers according to an exemplary embodiment of the present disclosure.

FIG. 8 illustrates a flowchart 800 including operational steps to preserve the integrity of copy-on-write device buffers using page remapping. The flowchart illustrated in FIG. 8 references the exemplary embodiment illustrated in FIG. 7, however, the exemplary embodiment illustrated in FIG. 7 does not limit the exemplary method steps illustrated in flowchart 800. Furthermore, the order of method steps illustrated in flowchart 800, in some embodiments, may execute in alternative orders, or in other embodiments, execute simultaneously while remaining within the scope and spirit of the disclosure.

The flowchart 800 includes step 810, wherein, in some embodiments, a process with user-access attempts to modify data in a page-locked buffer marked copy-on-write using a user buffer. As a consequence of attempting to modify data in the page-locked buffer marked copy-on-write, the processor may issue a page fault, for example indicating that the data is unavailable. The page-locked buffer marked copy-on-write may for example correspond to the page-locked device buffer 735 of FIG. 7 and the user buffer may correspond to the virtual user buffer 750 of FIG. 7.

Step 820 includes, in some embodiments, a process with kernel-level permissions, executing on a processor, copying data from the page-locked buffer in kernel address space to a non-page-locked buffer in user address space. Step 830 includes remapping the user buffer to the non-page-locked device buffer. Thus, a process with user-level permissions may read, write, or modify the data contained in the non-page-locked buffer and the corresponding user buffer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A method to copy data comprising:
   receiving, with a processor, a first virtual memory address mapped to a first physical memory address of a memory device and a second virtual memory address mapped to a second physical memory address of the memory device, wherein the memory device comprises data at the first physical memory address;
   mapping, with a first process executing with user permissions on the processor, a third virtual memory address to the first physical memory address of the memory device; and
   copying, with a second process executing with kernel permissions on the processor, the data at the first physical memory address to the second physical memory address.

2. The method of claim 1, further comprising:
   marking, with the processor, the first physical memory address as copy-on-write.

3. The method of claim 1, further comprising:
   modifying, with a third process executing with user permissions on the processor, the data using the third virtual memory address.

4. The method of claim 3, wherein the modifying further comprises:
   copying, with a fourth process executing with user permissions on the processor, the data at the first physical memory address to a third physical memory address of the memory device; and
   remapping, with the processor, the third virtual memory address to the third physical memory address.

5. The method of claim 3, wherein the modifying further comprises:
   issuing a page fault with the processor if the first physical memory address is marked copy-on-write.

6. The method of claim 1, further comprising:
   receiving, with the processor, the data via direct memory access (DMA) at the first physical memory address; and
   transmitting, with the processor, the data via DMA from the second physical memory address.

7. A system to copy data comprising:
   a memory; and
   a processor, coupled to the memory, configured to:
     map, with kernel permissions, a first virtual memory address to a first physical memory address in the memory;
     map, with kernel permissions, a second virtual memory address to a second physical memory address in the memory;
     receive the data at the first physical memory address;
     map, with user permissions, a third virtual memory address to the first physical memory address; and
     copy, with kernel permissions, the data from the first physical memory address to the second physical memory address.

8. The system of claim 7, wherein the processor is further configured to mark the first physical memory address copy-on-write.

9. The system of claim 7, wherein the processor is further configured to modify, with user permissions, the data using the third virtual memory address.

10. The system of claim 9, wherein the processor is further configured to:
    copy, with user permissions, the data at the first physical memory address to a third physical memory address; and
    remap the third virtual memory address to the third physical memory address.

11. The system of claim 9, the processor is further configured to issue a page fault when modifying, with user permissions, the data using the third virtual memory address, if the first physical memory address is marked copy-on-write.

12. The system of claim 7, further comprising a first device interface, coupled to the memory, configured to transfer the data into the memory at the first physical memory address.

13. The system of claim 7, further comprising a second device interface, coupled to the memory, configured to transfer the data out of the memory from the second physical memory address.

14. The system of claim 7, further comprising a DMA controller configured to:
   receive the data and store the data at the first physical memory address; and
   extract the data from the second physical memory address.

15. A non-transitory computer readable medium comprising instructions that when executed by a processor cause the processor to:
   map, with kernel permissions, a first virtual memory address to a first physical memory address;
   map, with kernel permissions, a second virtual memory address to a second physical memory address;
   receive data at the first physical memory address;
   map, with user permissions, a third virtual memory address to the first physical memory address; and
   copy, with kernel permissions, the data from the first physical memory address to the second physical memory address.

16. The non-transitory computer readable medium of claim 15, further comprising instructions that when executed by the processor cause the processor to:
   mark the first physical memory address copy-on-write.

17. The non-transitory computer readable medium of claim 15, further comprising instructions that when executed by the processor cause the processor to:
   modify, with user permissions, the data using the third virtual memory address.

18. The non-transitory computer readable medium of claim 17, further comprising instructions that when executed by the processor cause the processor to:
   issue a page fault when modifying, with user permissions, the data using the third virtual memory address, if the first physical memory address is marked copy-on-write.

19. The non-transitory computer readable medium of claim 17, further comprising instructions that when executed by the processor cause the processor to:
   configure a DMA controller to receive the data at the first physical memory address; and
   configure the DMA controller to extract the data from the second physical memory address.

20. The non-transitory computer readable medium of claim 15, further comprising instructions that when executed by the processor cause the processor to:
   copy, with user permissions, the data at the first physical memory address to a third physical memory address; and
   remap the third virtual memory address to the third physical memory address.

* * * * *